US006826495B2

(12) United States Patent
Quiet et al.

(10) Patent No.: US 6,826,495 B2
(45) Date of Patent: Nov. 30, 2004

(54) NOISE INJECTION METHOD TO CHARACTERIZE COMMON-CLOCK TIMING MARGINS

(75) Inventors: Duane Quiet, Hillsboro, OR (US); Garrett Hall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 09/968,462

(22) Filed: Sep. 28, 2001

(65) Prior Publication Data

US 2003/0065460 A1 Apr. 3, 2003

(51) Int. Cl.[7] ............................................. G01R 23/00
(52) U.S. Cl. ..................... 702/75; 702/69; 324/76.19; 327/21; 327/144
(58) Field of Search ............................. 702/75, 69, 66, 702/76; 324/76.19, 158.1; 327/2, 13, 18, 21, 26, 39, 42, 102, 144, 147

(56) References Cited

U.S. PATENT DOCUMENTS 5,162,723 A * 11/1992 Marzalek et al. ........ 324/76.19
5,646,521 A * 7/1997 Rosenthal et al. ....... 324/158.1
6,356,129 B1 * 3/2002 O'Brien et al. ............. 327/175

OTHER PUBLICATIONS

Nuno Borges de Carvalho and Jose Carlos Pedro, "Multi-tone Simulation of Mixers", 1998, Instituto de Telecommunicacoes–Universidade de Aveiro–3810–193 Averiro.*

A.K. Lu and G.W. Roberts, "An Analog Multi–Tone Signal Generator for Built–in–Self–Test Applications", Department of EE McGill University, Oct. 2–6, 1994.*

* cited by examiner

Primary Examiner—John Barlow
Assistant Examiner—Hien Vo
(74) Attorney, Agent, or Firm—Rob Anderson

(57) ABSTRACT

A noise injection method for characterizing common clock timing margin (jitter) includes injecting a single tone frequency, varying the amplitude of the injected frequency; measuring the signal produced at various signal amplitudes and analyzing the data obtained from measuring the signal. The obtained measurements may be analyzed using various characterizations such as measured jitter on input, measured jitter transfer, measured jitter tolerance, etc.

54 Claims, 8 Drawing Sheets

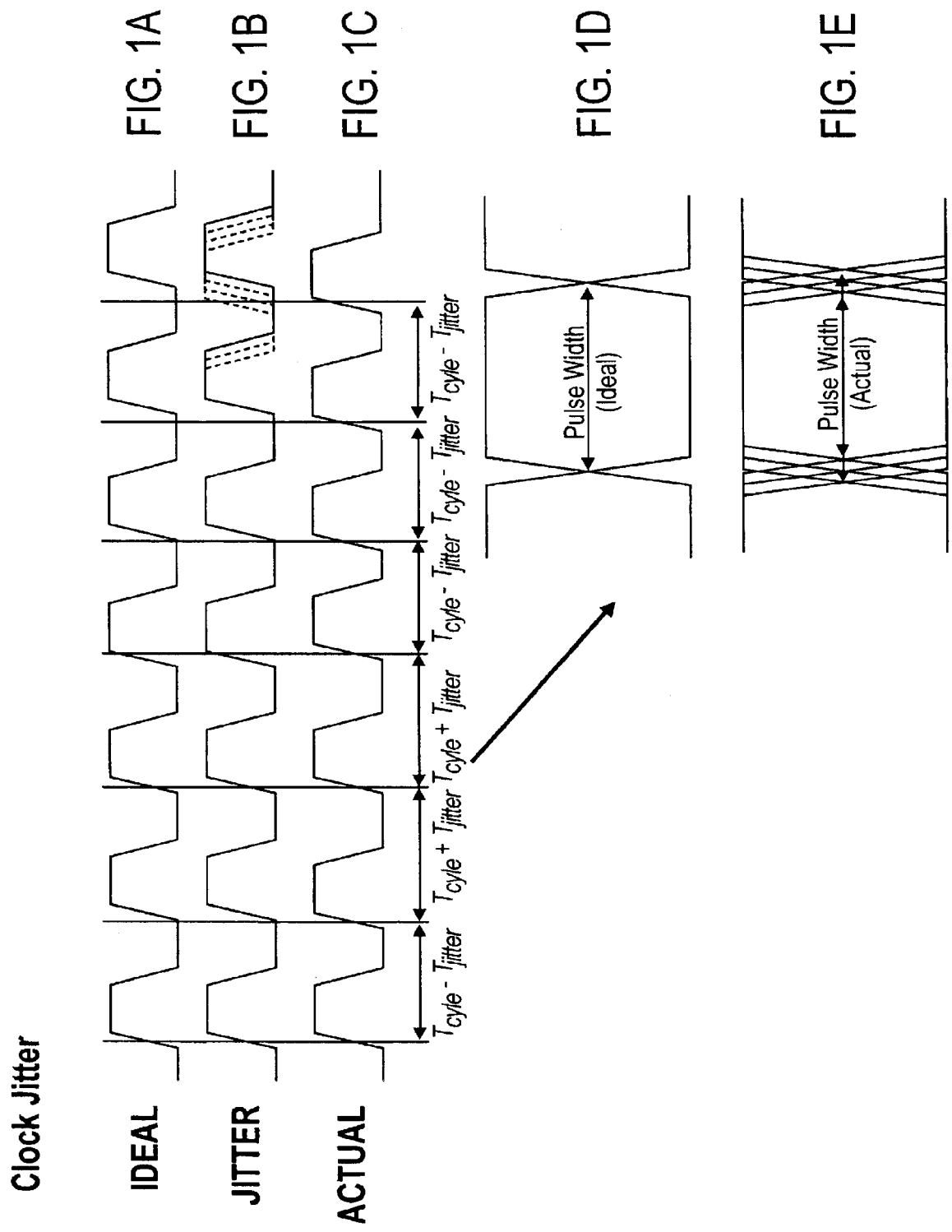

Cycle-Cycle Jitter

Period #580-581 = largest positive cycle-cycle jitter
Period 580 = 7.466 ns
Period 581 = 7.568 ns
Cycle-cycle = 7.568-7.466 = 0.102 ns = 102 p Period #594-595 = largest negative cycle-cycle jitter
Period 594 = 7.544 ns
Period 595 = 7.440 ns
Cycle-cycle = 7.544-7.440 = 0.104 ns = 104 p Receiver @ 1.1GHz

| Injected Frequency | Voltage at Function Generator | Actual Injected Noise | Input clock Jitter |
|---|---|---|---|
| 49.9 MHz | none - baseline | 0V | 162 (max) |
| 49.9 MHz | 0.5 V (pk-pk) | 48 mV (pk-pk) | 300 pS (mean) |
| 49.9 MHz | 1.0 V (pk-pk) | 96 mV (pk-pk) | 420 pS (mean) |
| 49.9 MHz | 1.5 V (pk-pk) | 144 mV (pk-pk) | 620 pS (mean) |

FIG. 5A

Receiver @ 1.2GHz

| Injected Frequency | Voltage at Function Generator | Actual Injected Noise | Input clock Jitter |
|---|---|---|---|
| 49.9 MHz | none - baseline | 0V | 155 pS (mean), 194 pS (max) |
| 49.9 MHz | 1.0 V (pk-pk) | 96 mV (pk-pk) | 392 pS (mean), 471 pS (max) |

FIG. 5B

NOISE INJECTION METHOD TO CHARACTERIZE COMMON-CLOCK TIMING MARGINS

FIELD OF THE INVENTION

The invention relates generally to the characterization of common clock timing margins. The invention relates more particularly to the characterization of common clock timing margins using jitter analysis.

BACKGROUND

Jitter is the displacement or deviation of some aspect of the pulses in a high frequency digital signal. The deviation can be in terms of amplitude, phase timing, or the width of the signal pulse. Another definition of jitter is the period frequency displacement of the signal from its ideal location. Among the causes of jitter are electromagnetic interference and crosstalk with other signals. Jitter can cause a display monitor to flicker, affect the ability of the processor in a personal computer to perform as intended, introduce clicks or other undesired effects into audio signals, and cause the loss of transmitted data between network devices. The amount of jitter that is allowable varies greatly and depends on the particular application.

Clock jitter is cycle to cycle variation in the clock period. The net effect of clock jitter is that it can reduce the total delay that signals are allowed to have for a given frequency target (i.e. jitter can reduce the clock cycle time, as illustrated in FIG. 1A–FIG. 1E). Causes of clock jitter include system noise that affects the response of clock driver circuits and system noise that affects the transmission characteristics of signals. Since this noise may affect the operation of a system, jitter must be considered in system analysis.

Electronic systems characteristically exhibit noise as a function of signal frequency at discrete and identifiable locations along a frequency spectrum. These points provide a signature of the systems sensitivity to signal stimulus at a given frequency. This signature may be used to characterize jitter introduced onto clock signals as a result of the noise that is exhibited. However, a complete characterization of the introduction of jitter onto clock signals resulting from the noise exhibitions cannot be made using such signatures. This is because the limited points of jitter introduction corresponding to the limited points of noise exhibition reflected in such signatures provide an incomplete picture of a systems sensitivity to noise. As a result, the usefulness of such signatures is limited as a jitter analysis tool.

As suggested above, introducing jitter onto a clock signal and characterizing it once introduced is one method of analyzing jitter. A prior art method of introducing jitter to a clock signal is illustrated in FIG. 1F. This figure illustrates the introduction of jitter by the removal of decoupling capacitors from the clock driver. FIG. 1F shows a clock driver chip. Each of the circles shown therein identifies a 3.3V supply pin. Intel's™ reference platforms recommend a 0.1 uF capacitor between each pin and ground. The removal of some of these capacitors will increase the output clock jitter, but not predictably. Removal of decoupling capacitors also directly impacts output edge rates. As a result, all timing must be re-tested and validated for the clock driver when decoupling is reduced.

BRIEF DESCRIPTION OF THE DRAWINGS

The present invention is illustrated by way of example and not limitation in the figures of the accompanying drawings, in which like references indicate similar elements and in which:

FIG. 1A, FIG. 1B, FIG. 1C, FIG. 1D and FIG. 1E show a graphical illustration of clock jitter.

FIG. 5A and FIG. 5B show jitter measurement results for a system motherboard obtained using a process executed in accordance with one embodiment of the present invention.

DETAILED DESCRIPTION

Figure 1F:
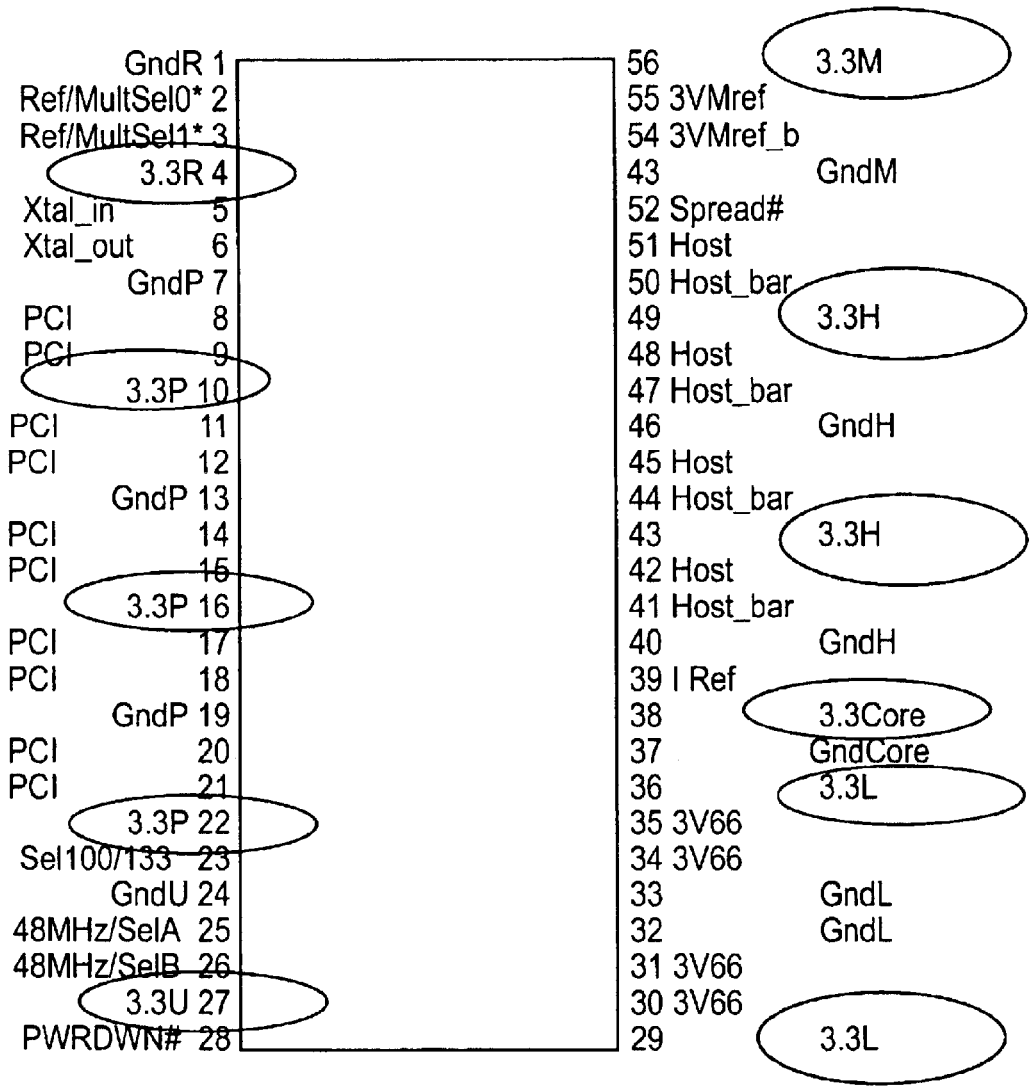
FIG. 1F shows a prior art system used to increase the jitter on a clock signal.
Figure 2:
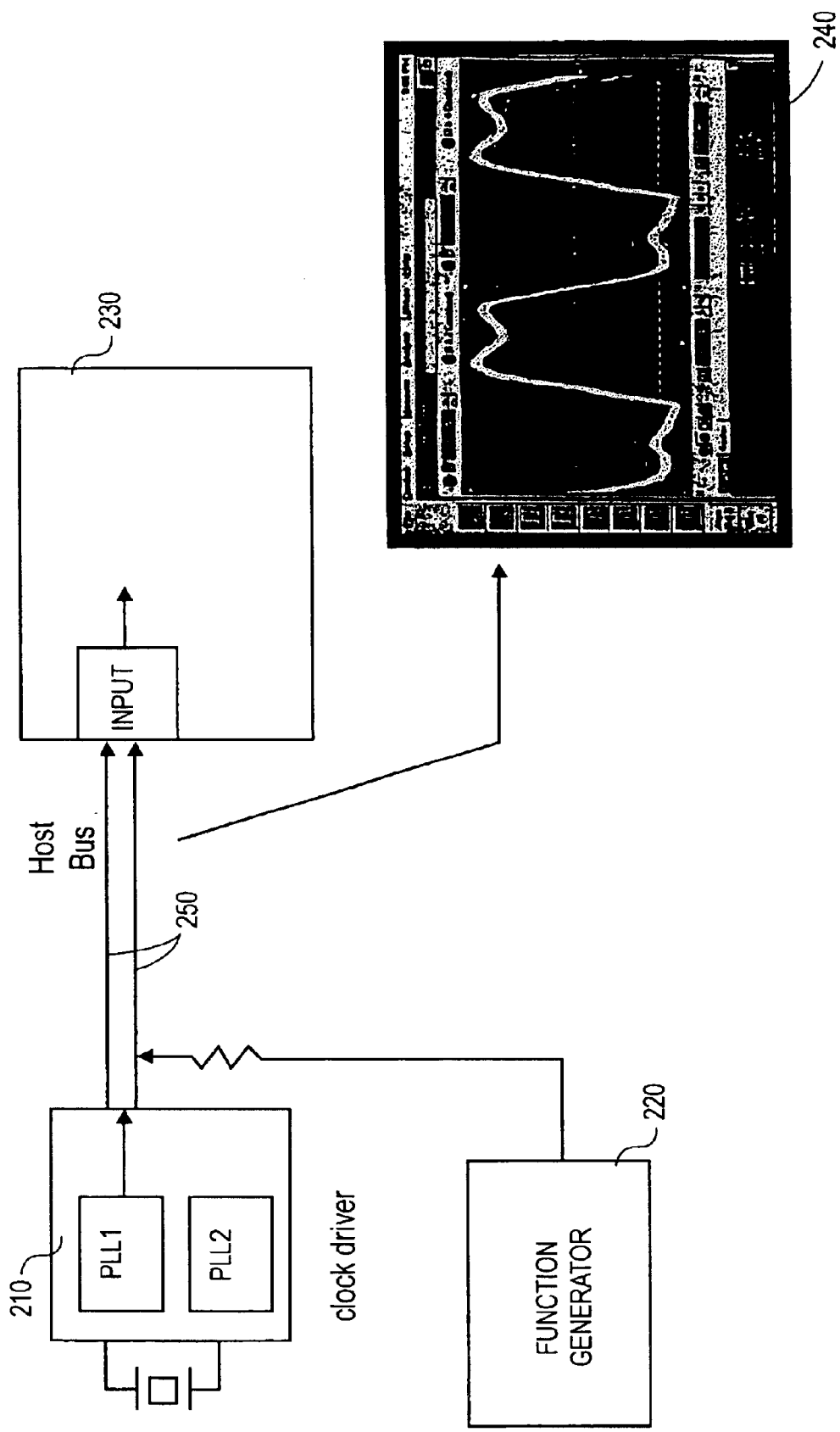
FIG. 2 shows a system architecture for jitter analysis according to one embodiment of the present invention.

FIG. 2 shows a system architecture used in accordance with one embodiment of the present invention. Referring to FIG. 2 there is shown clock driver 210, noise injector 220, receiver 230 and jitter measurement device 240. Clock driver 210 supplies the input clock to the receiver 230. In one embodiment of the invention, the clock driver comprises PLL-1 (Phase Locked Loop) and PLL-2 (Phase Locked Loop) as shown in FIG. 2. In one embodiment, the clock driver supplies a 100 MHz differential clock along host bus 250. In one embodiment clock driver 210 has differential clock outputs of 0.7V amplitude and a worst case baseline jitter of 162 ps. In one embodiment the noise injector 220 shown in the lower-left hand corner of FIG. 2 is a function generator whose output is a single-ended sinusoid of varying amplitude.

In one embodiment, noise injector 220 encompasses a sine wave function generator. In one embodiment, the noise injector supplies a sine wave to the host bus through a 470 Ohm resistor. The sine wave is injected to create cycle-to-cycle jitter. In one embodiment, a single tone (50 MHz) at half of the host bus frequency is injected. In one embodiment, the amplitude is varied to create more or less jitter. Generally, an increase in the amplitude increases the amount of jitter that is observed. In one embodiment, the output of the function generator is coupled to a simple 50 Ohm shielded cable which is connected to a series 475 Ohm resistor. In one embodiment, the cable and the resistor are connected to allow easy mechanical connection to one of the output traces coming from clock driver 210.

The resultant signal is transmitted to receiver 230. The receiver 230 may include a CPU, ASIC or other logic device. The receiver includes a differential input pair which carries the transmitted signal into the receiver 230. The differential output pair of the clock driver are connected to the input differential pair of the receiver device as normal, but a mechanical connection to the resistor/cable/function generator is placed on one of the output traces from the clock driver. This can be done at either end of the transmission line (driver or receiver end) but is shown at the driver in FIG. 2.

In one embodiment, the function generator's output is configured to produce a sinusoid at half of the frequency of the clock driver output (49.9 MHz for the 100 MHz host clock). Increasing the peak—peak amplitude of the function generator will result in a directly proportional increase in cycle—cycle jitter at the input of the receiver differential pair. In one embodiment where a 475 Ohm resistor is coupled to the function generator's output, the resistor operates to attenuate the function generator amplitude at approximately 10:1, so that the effect of the resultant voltage change on the input signal integrity does not interfere with proper circuit operation. It should be noted that other frequency and resistor values, and coupling methods may be employed in other exemplary embodiments.

The jitter measurement device measures the jitter in the signal being supplied to the receiver 230. The device, as is shown in FIG. 2, displays a waveform measurement representing the measured clock signal with injected jitter.

Figure 3:
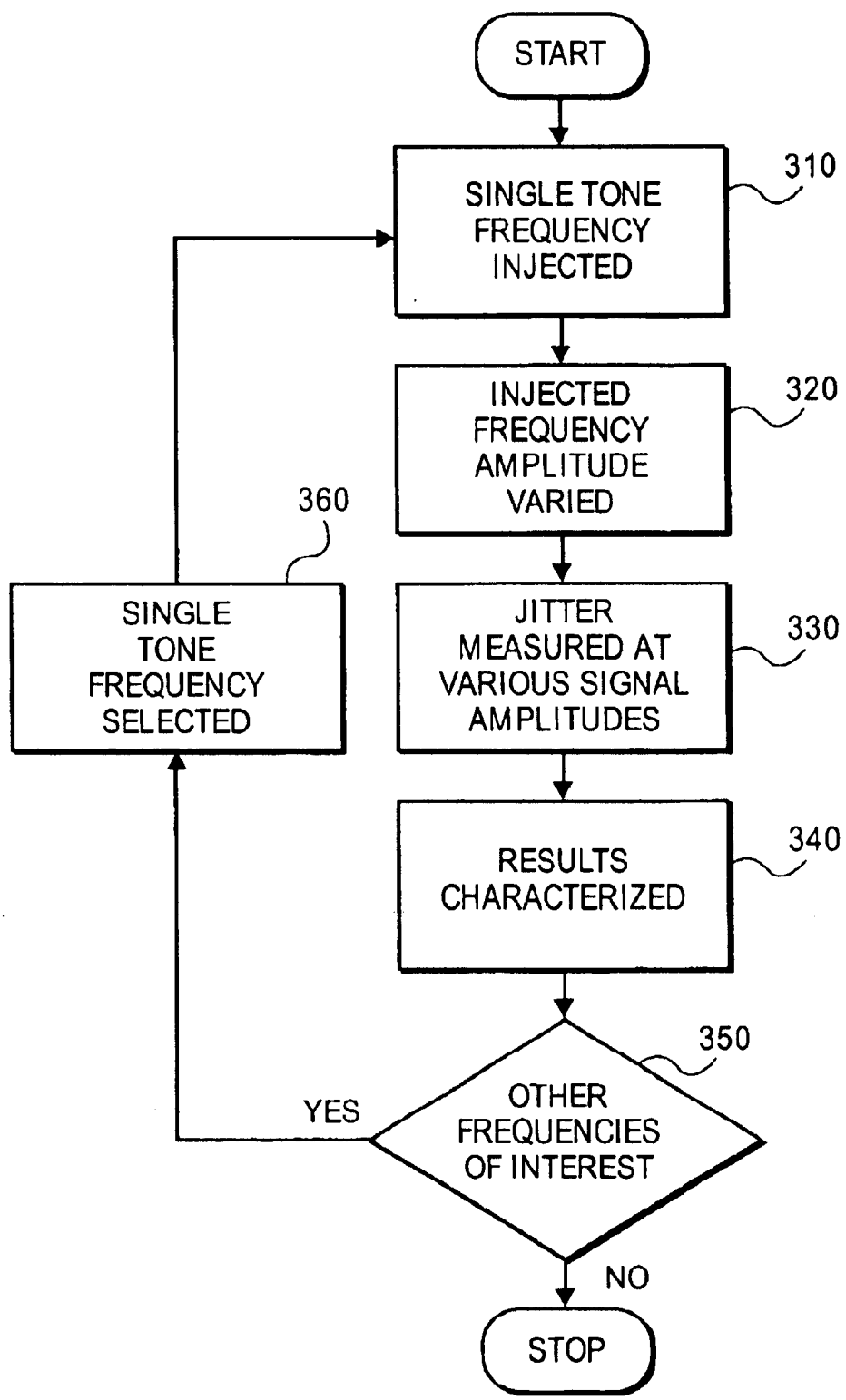
FIG. 3 shows a jitter measurement methodology executed in accordance with one embodiment of the present invention.

FIG. 3 shows an exemplary jitter measurement methodology executed in accordance with one embodiment of the present invention. Referring to FIG. 3, at operation 310 the tester injects a single tone frequency. As mentioned earlier, this single tone frequency may be provided by a sine wave function generator.

At operation 320, the signal injected at operation 310 is amplitude varied. By varying the amplitude, the tester can observe jitter variation corresponding to various signal amplitude levels.

At operation 330 the jitter produced at various signal amplitudes is measured. These measurements provide data that may be analyzed using various methods.

At operation 340, the results are characterized. Analytical mechanisms may include, but are not limited to, injection voltage vs. results, measured jitter on input, or other jitter characterizations such as jitter transfer, jitter tolerance, and jitter generation/output.

At operation 350, it is determined whether or not there are other frequencies of interest for injection purposes. If there are not then the process is ended. If there are then the process proceeds to operation 360 where another single tone frequency is selected for injection.

Figures 4A, 4B, 4C:
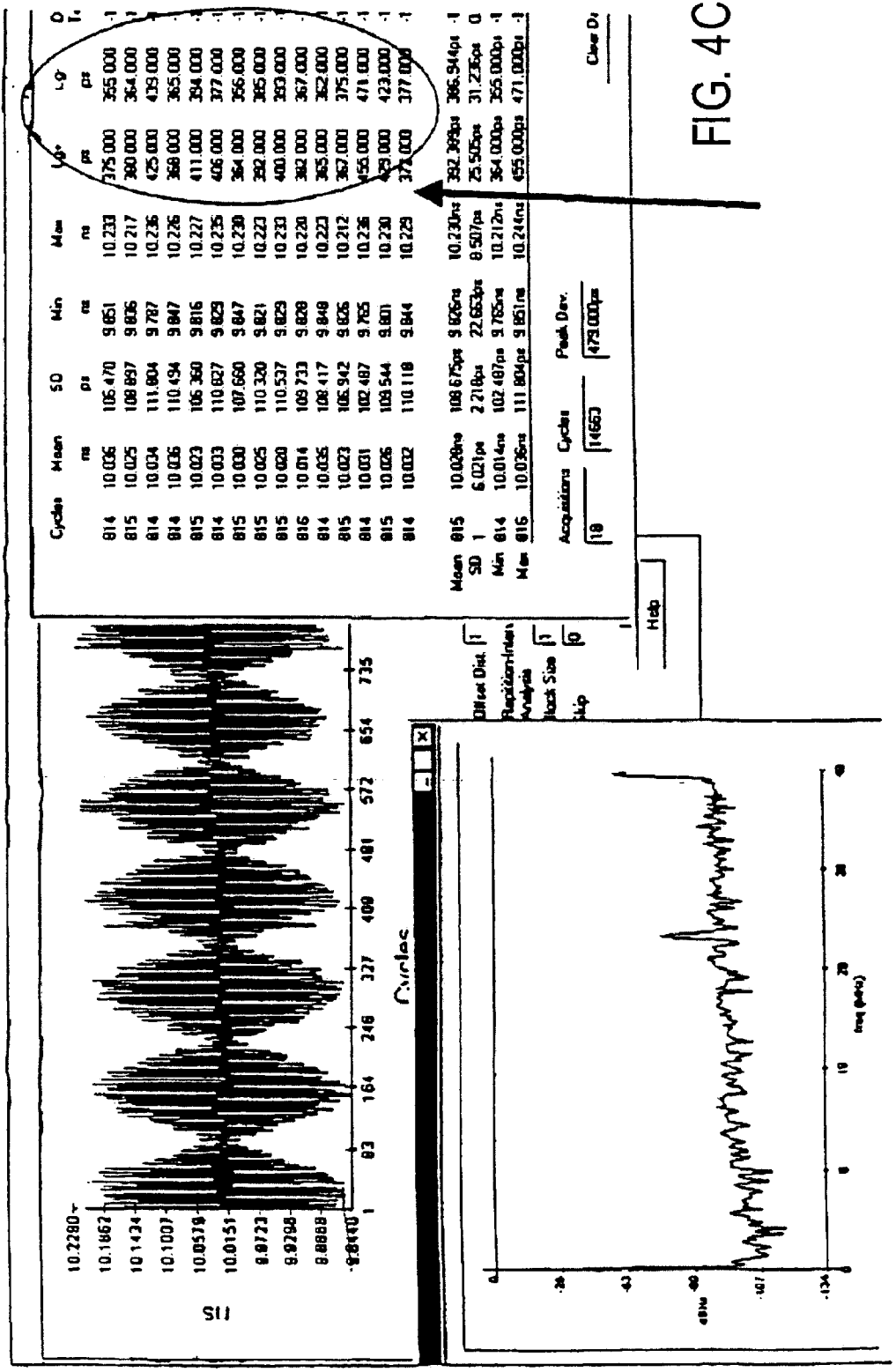
FIG. 4A, FIG. 4B, FIG. 4C and FIG. 4D show the measured jitter on input results obtained using a process in accordance with one embodiment of the present invention.

FIGS. 4A, 4B, 4C and 4D show tabular and graphical representations of measured jitter on input results obtained using processes in accordance with one embodiment of the present invention. FIG. 4A is a time domain representation of jitter on input measurements made after the injection of jitter. The measurements represented by this line graph may be organized and presented in tabular form as is shown in FIG. 4C and described with reference to FIG. 4A below.

FIG. 4B is a frequency domain representation of jitter on input measurements made after injection. The range of measurements are taken from zero to half the frequency of the bus which in the case shown is about 50 MHz. Such measurements as are shown in FIG. 4B may also be performed using a spectrum analyzer.

FIG. 4C is a tabular display of measured jitter characterizations which are based on several acquisitions of sample measurements. The table shows categories of measurements representing the largest positive cycle to cycle jitter (Lg+) and largest negative cycle to cycle jitter (Lg−) detected, minimum (min) and maximum (max) cycle measurements, and calculations of the standard deviation (SD) and mean of the sampled measurements. It should be noted that measurements taken in consecutive periods are used in determining the largest positive and negative cycle to cycle jitter.

Figure 4D:
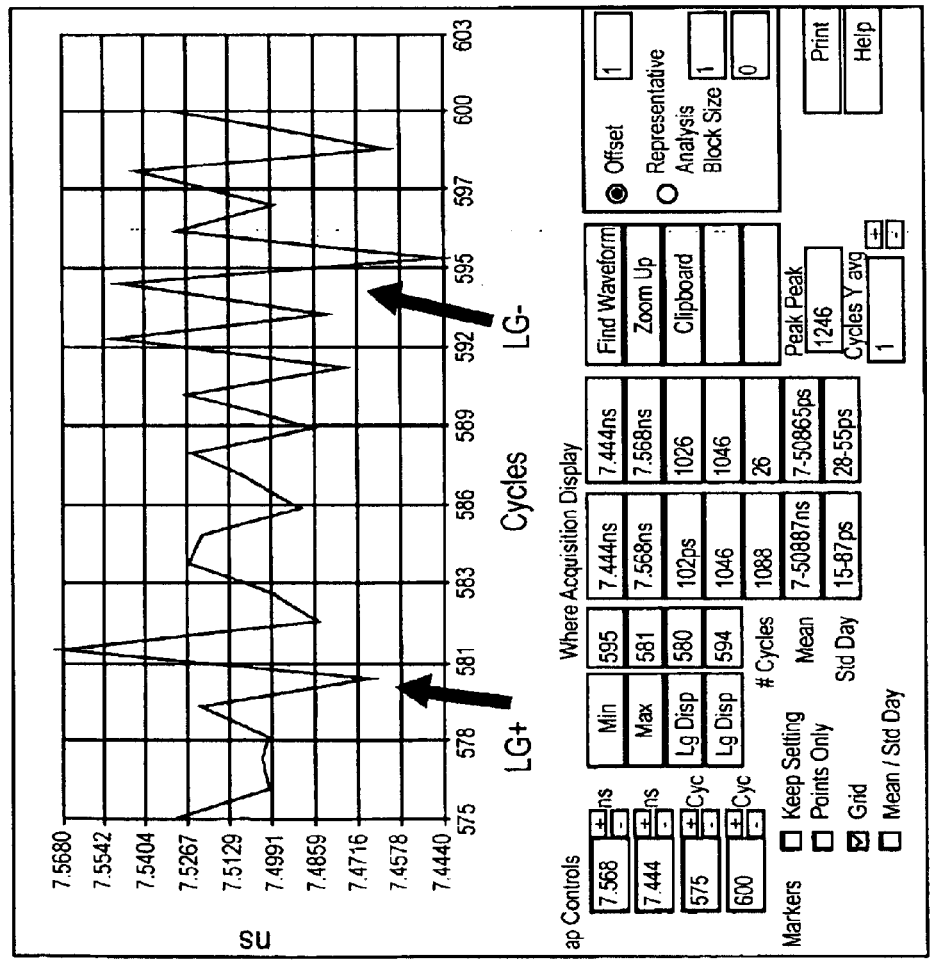

FIG. 4D is a time domain representation of jitter on input measurements made after the injection of jitter similar to that shown in FIG. 4A. However the line graph shown in FIG. 4D is expanded so that specific details may be illustrated. Arrow LG+ indicates the location on the line graph of the largest positive cycle to cycle jitter. It occurs between periods 580 and 581. By contrast, the largest negative cycle to cycle jitter occurs between periods 594 and 595 as is indicated by arrow LG−. The calculation at the right side of the graph illustrates how cycle to cycle jitter is actually computed. The values obtained and parameters measured may be organized and presented in tabular form as is shown and described with reference to FIG. 4C.

An example of results obtained using the herein described methodology is shown in FIG. 5A. FIG. 5A shows jitter characterization results for a system using a process executed in accordance with one embodiment of the present invention. The table contains data including discrete results corresponding to various signal amplitudes. Referring to FIG. 5A, the injected frequencies were held constant at 49.9 MHz. However, the voltage at the function generator was varied. For 0 V, the actual injected noise was measured at 0 V. The input clock jitter corresponding to this injection of noise was 162 ps.

For a peak-to-peak voltage of 0.5 V, the actual injected noise was recorded to be 48 mV. This resulted in a measured input clock jitter of 300 ps. For a 1 V peak-to-peak injected voltage, the actual injected noise measured was 96 mV. A measured input clock jitter of 420 ps corresponded to the injected voltage. From a 1.5 V peak-to-peak injected voltage at the function generator was produced an actual injected noise of 144 mV. The measured input clock jitter corresponding to this voltage of 620 ps.

Another example of results obtained using the herein described methodology is shown in FIG. 5B. FIG. 5B shows results obtained with the receiver operating at 1.2 GHz. At a 0 V baseline voltage was measured 0 V of actual injected noise. The input clock jitter measured for this value was 155 ps (mean) and 194 ps (max). For a 1 V peak-to-peak injection, there was recorded an actual injected noise of 96 mV peak-to-peak. The input clock jitter measured in this case was 392 ps (mean) and 470 ps (max).

The measurements recorded in the table shown in FIG. 5A and FIG. 5B illustrate discrete results after injections of 0, 48, 96 and 144 mV. The data clearly demonstrates that changing the amplitude of the voltage at the function generator causes a resultant change in the input clock jitter. In particular, the data shows that an increase in the amplitude of the voltage at the function generator causes a corresponding increase in the input clock jitter. It should be noted that a similar systemic response (an increase in input clock jitter corresponding to increases in voltage amplitude at the function generator) is observed for single tone frequency injections/stimuli of other values.

Figure 6:
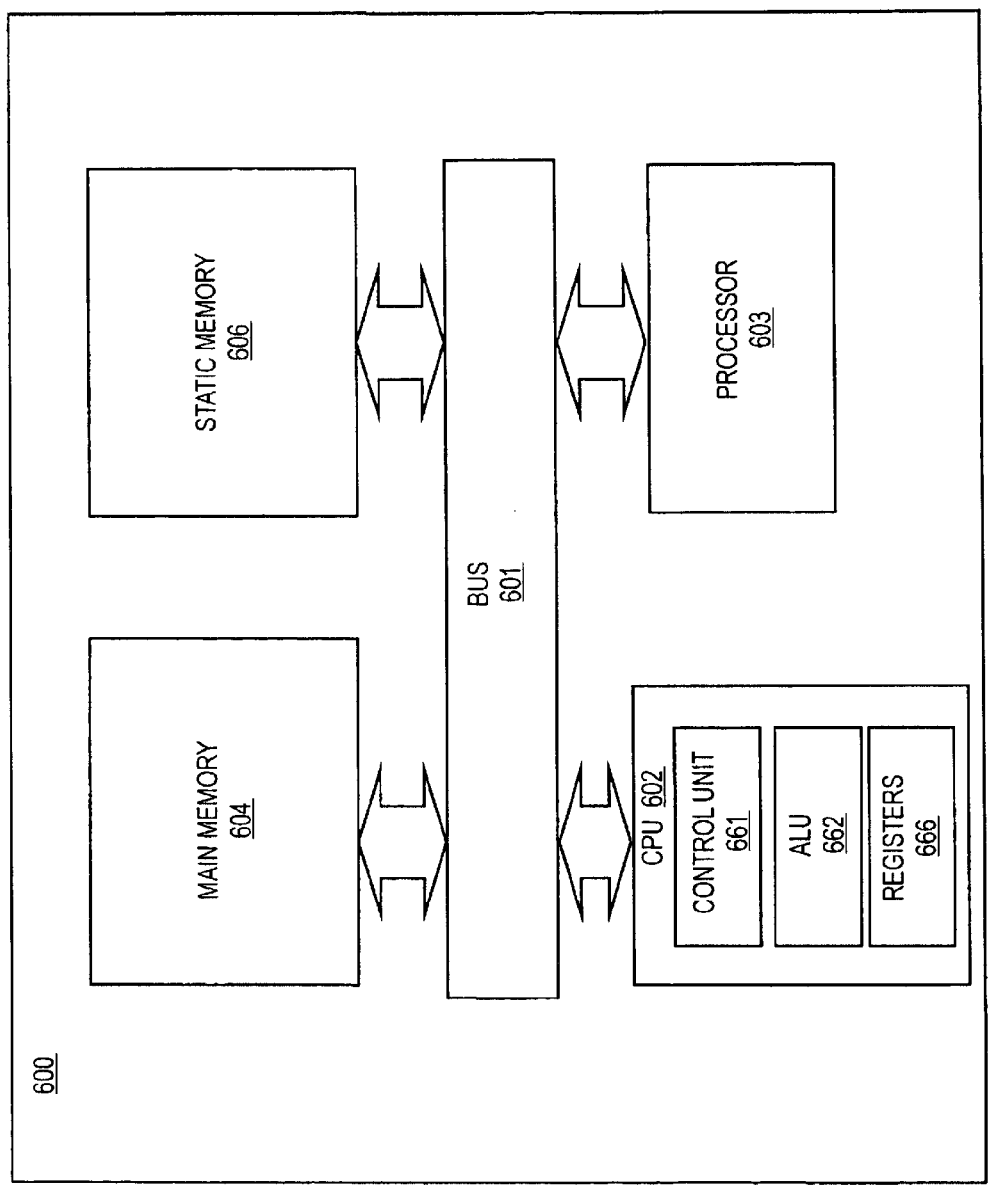
FIG. 6 shows an exemplary processing system in which an embodiment of the invention may be implemented.

FIG. 6 depicts an exemplary processing system 600 in which one embodiment of the invention may be implemented. For one embodiment, the common clock timing margin (jitter) characterizing operations may be executed using a general processing architecture. Referring to FIG. 6, the processing system may include a bus 601 or other communication means for communicating information, and a central processing unit (CPU) 602 coupled to the bus for processing information. CPU 602 includes a control unit 631, an arithmetic logic unit (ALU) 632, and registers 633. CPU 602 can be used to implement the common clock timing margin (jitter) characterizing operations described herein. Furthermore, another processor 603 such, for example a coprocessor, may be coupled to bus 601 for additional processing power and speed.

The processing system 600 also includes a main memory 604, which may be a random access memory (RAM) device that is coupled to the bus 601. The main memory stores information and instructions to be executed by CPU 602.

Main memory 604 may also store temporary variables and other intermediate information during the execution of instructions by CPU 602. The processing system also includes a static memory 606, for example a read only memory (ROM) and/or other static device that is coupled to the bus for storing static information and instructions for CPU 602.

In addition, a method of varying the frequency and voltage of the herein described function generator can be stored in memory of a computer system as a set of instructions to be executed. The instructions to perform the methods herein described could alternately be stored on other forms of computer readable mediums including magnetic and optical disks. For example, the method of the present invention can be stored on computer readable-mediums, such as magnetic disks or optical disks that are accessible via a disk drive (or computer readable medium drive).

In the foregoing specification, the invention has been described with reference to specific exemplary embodiments thereof. It will however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. An analysis method comprising:
   providing a single tone stimulus to a clock driver output signal provided on a transmission line;
   registering a systemic response to the stimulus for a given voltage level; and
   characterizing the registered systemic response;
   wherein the characterizing provides a measure of a systems sensitivity.

2. The method of claim 1, wherein the systemic response is registered for a range of voltage values.

3. The method of claim 1, wherein a range of single tone stimuli are provided to the signal.

4. The method of claim 1, wherein the stimulus is a sine wave signal.

5. The method of claim 1, wherein the transmission line comprises a bus.

6. The method of claim 5, wherein the bus is a host bus.

7. The method of claim 1, wherein the single tone stimulus is provided in parallel with the clock driver output signal.

8. The method of claim 1, wherein the single tone stimulus is provided by coupling to an output trace providing the clock driver output signal.

9. The method of claim 1, wherein the single tone stimulus is provided at a driver end of the transmission line.

10. The method of claim 1, wherein the single tone stimulus is provided at a receiver end of the transmission line.

11. A method for characterizing jitter comprising:
    injecting a single tone frequency onto a clock driver output signal provided on a host bus;
    varying the amplitude of the injected frequency;
    receiving a signal produced at various amplitudes of the injected frequency; and
    generating an analysis of data obtained by measuring the signal.

12. The method of claim 11, wherein data is characterized using injection voltage vs. results.

13. The method of claim 11, wherein data is characterized using injection measured jitter on input.

14. The method of claim 11, wherein data is characterized using injection measured jitter transfer.

15. The method of claim 11, wherein data is characterized using injection measured jitter tolerance.

16. The method of claim 11, wherein data is characterized using injection measured jitter generation.

17. The method of claim 11, wherein the transmission line comprises a bus.

18. The method of claim 17, wherein the bus is a host bus.

19. The method of claim 11, wherein the single tone frequency is injected in parallel with the clock driver output signal.

20. The method of claim 11, wherein the single tone frequency is injected by coupling to an output trace providing the clock driver output signal.

21. The method of claim 11, wherein the single tone frequency is injected at a driver end of the transmission line.

22. The method of claim 11, wherein the single tone frequency is injected at a receiver end of the transmission line.

23. A machine readable medium that provides instructions which, when executed by a machine, causes the machine to perform operations comprising:
    injecting a single tone frequency onto a clock driver output signal provided on a transmission line;
    varying the amplitude of the injected frequency;
    receiving the signal produced at various signal amplitudes; and
    generating an analysis of data obtained from measuring the signal produced at various amplitudes.

24. The medium of claim 23, wherein data is characterized using injection voltage vs. results.

25. The medium of claim 23, wherein data is characterized using injection measured jitter on input.

26. The medium of claim 23, wherein data is characterized using injection measured jitter transfer.

27. The medium of claim 23, wherein data is characterized using injection measured jitter tolerance.

28. The medium of claim 23, wherein data is characterized using injection measured jitter generation.

29. The medium of claim 23, wherein the single tone frequency is injected in parallel with the clock driver output signal.

30. The medium of claim 23, wherein the single tone frequency is injected at a driver end of the transmission line.

31. An apparatus comprising:
    a memory to store blocks of information; and
    a processor which executes instructions provided by memory which causes the apparatus to perform operations comprising:
    injecting a single tone frequency onto a clock driver output signal provided on a transmission line;
    varying the amplitude of the injected frequency;
    receiving the signal produced at various signal amplitudes; and
    generating an analysis of data obtained from measuring the signal produced at various amplitudes.

32. The apparatus of claim 31, wherein data is characterized using injection voltage.

33. The apparatus of claim 31, wherein data is characterized using injection measured jitter on input.

34. The apparatus of claim 31, wherein data is characterized using injection measured jitter transfer.

35. The apparatus of claim 31, wherein data is characterized using injection measured jitter tolerance.

36. The apparatus of claim 31, wherein data is characterized using injection measured jitter generation.

37. The apparatus of claim 31, wherein the transmission line comprises a bus.

38. The apparatus of claim 37, wherein the bus is a host bus.

39. The apparatus of claim 31, wherein the single tone frequency is injected in parallel with the clock driver output signal.

40. The apparatus of claim 31, wherein the single tone frequency is injected by coupling to an output trace providing the clock driver output signal.

41. The apparatus of claim 31, wherein the single tone frequency is injected at a driver end of the transmission line.

42. The apparatus of claim 31, wherein the single tone frequency is injected at a receiver end of the transmission line.

43. A system comprising:
- a clock driver to provide a clock driver output signal on a transmission line;
- a jitter noise injector to inject utter noise in the clock driver output signal on the bus;
- a receiver; and
- a jitter measurement device;
- wherein the jitter measurement device measures jitter supplied to the receiver.

44. The system of claim 43, wherein data is characterized using injection voltage.

45. The system of claim 43, wherein data is characterized using injection measured jitter on input.

46. The system of claim 43, wherein data is characterized using injection measured jitter transfer.

47. The system of claim 43, wherein data is characterized using injection measured jitter tolerance.

48. The system of claim 43, wherein data is characterized using injection measured jitter generation.

49. The system of claim 48, wherein the transmission line comprises a bus.

50. The system of claim 49, wherein the bus is a host bus.

51. The system of claim 48, wherein the single tone frequency is injected in parallel with the clock driver output signal.

52. The system of claim 48, wherein the single tone frequency is injected by coupling to an output trace providing the clock driver output signal.

53. The system of claim 48, wherein the single tone frequency is injected at a receiver end of the transmission line.

54. The system of claim 48, wherein the single tone frequency is injected at a driver end of the transmission line.

* * * * *

UNITED STATES PATENT AND TRADEMARK OFFICE
CERTIFICATE OF CORRECTION

PATENT NO. : 6,826,495 B2
DATED : November 30, 2004
INVENTOR(S) : Quiet et al.

It is certified that error appears in the above-identified patent and that said Letters Patent is hereby corrected as shown below:

Column 4,
Line 26, delete "of" and insert -- was --.

Column 17,
Line 19, delete "utter" and insert -- jitter --.

Signed and Sealed this

Twelfth Day of July, 2005

JON W. DUDAS
*Director of the United States Patent and Trademark Office*